(12) United States Patent
Vetter et al.

(10) Patent No.: US 7,813,592 B2
(45) Date of Patent: Oct. 12, 2010

(54) SYSTEM AND METHOD FOR NON-RIGID MULTI-MODAL REGISTRATION ON THE GPU

(75) Inventors: Christoph Vetter, Plainsboro, NJ (US);
Christoph Guetter, Princeton, NJ (US);
Chenyang Xu, Allentown, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 867 days.

(21) Appl. No.: 11/692,293

(22) Filed: Mar. 28, 2007

(65) Prior Publication Data

US 2008/0037865 A1     Feb. 14, 2008

Related U.S. Application Data

(60) Provisional application No. 60/836,623, filed on Aug. 9, 2006.

(51) Int. Cl.
*G06K 9/32*     (2006.01)
*G06K 9/00*     (2006.01)
*G06K 9/40*     (2006.01)
*G09G 5/00*     (2006.01)

(52) U.S. Cl. ........................ 382/294; 382/168; 382/260; 345/651

(58) Field of Classification Search .................. 382/168, 382/260, 274, 294, 264, 284; 345/418, 611, 345/651, 649
See application file for complete search history.

(56) References Cited

U.S. PATENT DOCUMENTS

| | | | | |
|---|---|---|---|---|
| 7,280,710 | B1 * | 10/2007 | Castro-Pareja et al. | 382/303 |
| 7,639,896 | B2 * | 12/2009 | Sun et al. | 382/294 |
| 7,653,264 | B2 * | 1/2010 | Hero et al. | 382/294 |
| 2006/0110071 | A1 * | 5/2006 | Ong et al. | 382/294 |

\* cited by examiner

*Primary Examiner*—Kanji Patel
(74) *Attorney, Agent, or Firm*—Donald B. Paschburg; F. Chau & Associates, LLC

(57) ABSTRACT

A method for non-rigid multi-modal registration of digitized images includes providing a reference image and an alignment images acquired from different imaging modalities to a graphics processing unit (GPU), initializing a deformation field for registering said reference image and said alignment image, computing marginal and joint intensity histograms of the reference image and the alignment image as registered by said deformation field, computing gradients of the reference and registered alignment images and of their respective marginal and joint intensity histograms, smoothing said histograms and gradients using Gaussian filters, calculating a new deformation field using said smoothed gradients, and registering said alignment image to said reference image using said deformation field.

27 Claims, 8 Drawing Sheets

SYSTEM AND METHOD FOR NON-RIGID MULTI-MODAL REGISTRATION ON THE GPU

CROSS REFERENCE TO RELATED UNITED STATES APPLICATIONS

This application claims priority from: "GPU-accelerated non-rigid multi-modal registration", U.S. Provisional Application No. 60/836,623 of Guetter, et al., filed Aug. 9, 2006, the contents of which are herein incorporated by reference.

TECHNICAL FIELD

This disclosure is directed to GPU-accelerated registration of digital medical image volumes acquired from different imaging modalities.

DISCUSSION OF THE RELATED ART

Non-rigid multi-modal registration of images/volumes is becoming increasingly necessary in many medical settings, as CT, PET or SPECT imaging is becoming more common. Non-rigid registration techniques are necessary to fuse the anatomical and functional information from these imaging procedures in order help diagnosis. While efficient registration algorithms have been published, the speed of the solutions is a problem in clinical applications.

A registration algorithm also needs to cope with different modalities. Mutual information is usually taken as the basis for multi-modal registration. But the context-free nature of this metric limits its usefulness. A learned joint intensity distribution can provide context-specific information that constrains the registration.

In clinical settings, however, not only the accuracy of the registration but also its speed is crucial. Recently, much effort has been focused on using the computational power of graphics processing units (GPUs) for general purpose computations as diverse as numerical algorithms or database operations. Since GPUs not only surpass the computational power of CPUs in many aspects and their speed is increasing at a faster pace, the advantages of using GPUs are only going to become more pronounced.

However, while GPUs handle images and volumes easily, because these data structures map directly to the graphics data structures for which GPUs are built, the intrinsic restrictions in the GPU programming model prohibit a straightforward port from the CPU to the GPU. Instead, every step of the registration process has to be tuned for the GPU, often requiring a different algorithmic approach. Furthermore, the restriction to 32-bit floating point values instead of double precision makes necessary an evaluation of GPU versus CPU implementation concerning registration quality and speed.

Apart from the speed improvement, using the GPU offers another advantage, the simultaneous visualization of the registration process that is easier with a GPU-based algorithm since all the necessary data is already in video memory. Apart from one GPU-based non-rigid registration method, there has been little research into this area, especially for multimodal registrations.

SUMMARY OF THE INVENTION

Exemplary embodiments of the invention as described herein generally include methods and systems for the implementation of a non-rigid, multi-modal registration using mutual information and the Kullback-Leibler divergence between observed and learned joint intensity distributions. According to an embodiment of the invention, the entire registration process is implemented on the GPU, including a GPU-friendly computation of two-dimensional histograms using vertex texture fetches as well as an implementation of recursive Gaussian filtering on the GPU. Since the computation is performed on the GPU, interactive visualization of the registration process can be performed without bus transfer between main memory and video memory. Visualizing the registration process allows the expert to quickly check the plausibility of the registration and is the first step for interactive improvement of registration. According to other embodiments the invention, two hybrid approaches distributing the computation between the GPU and CPU are disclosed. A first embodiment uses the CPU for lower resolutions and the GPU for higher resolutions, and a second embodiments uses the GPU to compute a first approximation to the registration that is used as starting point for registration on the CPU using double-precision. The results of the CPU implementation are compared to the different approaches using the GPU regarding speed as well as image quality. A GPU implementation can perform up to 5 times faster per iteration than the CPU implementation. Current graphics cards are still limited by the amount of memory. Considering that textures for intermediate results need to be stored in video memory as well, large volumes cannot always be kept in video memory. However, if the growing demand for fast non-rigid registration cannot be fulfilled by algorithmic improvements alone, the computational power of GPUs allows an application of these algorithms in practice for datasets that fit in GPU memory.

According to an aspect of the invention, there is provided a method for non-rigid multi-modal registration of digitized images including providing a reference image and an alignment images acquired from different imaging modalities to a graphics processing unit (GPU), wherein each said image comprises a set of intensities defined on a 3-dimensional (3D) grid of points, initializing a deformation field for registering said reference image and said alignment image, computing marginal and joint intensity histograms of the reference image and the alignment image as registered by said deformation field, computing gradients of the reference and registered alignment images and of their respective marginal and joint intensity histograms, smoothing said histograms and gradients using Gaussian filters, calculating a new deformation field using said smoothed gradients, and registering said alignment image to said reference image using said deformation field.

According to a further aspect of the invention, the method comprises calculating a mutual information metric and a Kullback-Leibler (KL) divergence metric from said reference image and said registered alignment image wherein a quality of said registration is determined.

According to a further aspect of the invention, gradients are computed by a pixel shader on said GPU.

According to a further aspect of the invention, the method comprises storing histograms as 2D textures in a memory associated with said GPU, and storing each 3D image as a sequence of 2D slices in a sequence of 2D textures tile in said GPU memory.

According to a further aspect of the invention, the method comprises copying a 2D slice of the registered alignment image to a texture format that supports interpolation, performing bilinear interpolation on texels within said slice, and displaying said interpolated slice on a display monitor.

According to a further aspect of the invention, calculating a joint histogram comprises providing a vertex for a texel of a 2D slice of one of said reference or alignment images, shifting, in a vertex program of said GPU, the output position of the vertex according to the intensities associated with the texel in the corresponding slices of the reference image and alignment image, and rendering said texel into a 2D target representing said histogram as a floating point value of 1.0 wherein said value is accumulated by a frame buffer operations stage of said GPU in the target with blending enabled.

According to a further aspect of the invention, calculating a marginal histogram of one of said reference or alignment images comprises selecting an intensity bin of said histogram, performing an occlusion query for said intensity bin in one of reference or alignment images, and counting the number of points returned by said query.

According to a further aspect of the invention, smoothing said histograms and gradients using Gaussian filters comprises storing filter coefficients in uniform variables associated with a pixel shader, precomputing a texture with the filter coefficients, and providing said precomputed texture to said pixel shader wherein said texture is filtered using automatic interpolation of vertex attributes provided by said shader.

According to a further aspect of the invention, smoothing said histograms and gradients using Gaussian filters comprises, for a histogram or gradient represented by a 2D texture, for each of an x-, y-directions, writing one line at a time while using the data from the input texture at the position of the line, smoothing all texel values in said line primitive in parallel for all the texels covered by the line, reading a next line of said texture into said line primitive, smoothing all texel values in said line primitive in parallel for all the texels covered by the line wherein said smoothed texel values from a current line are weighted by the smoothing results from previous lines.

According to a further aspect of the invention, smoothing said histograms and gradients using Gaussian filters for a z-direction comprises writing one tile at a time while using the data from the input texture at the position of the tile, smoothing all texel values in said quad primitive in parallel for all the texels covered by the tile, reading a next tile of said texture into said quad primitive, smoothing all texel values in said quad primitive in parallel for all the texels covered by the tile wherein said smoothed texel values from a current tile are weighted by the smoothing results from previous tiles.

According to a further aspect of the invention, the method comprises downsampling said reference and alignment images prior to calculating a new deformation field, upsampling the new deformation field calculated to register said reference and alignment images, and using said upsampled deformation field to initialize another registration of said reference and alignment images.

According to a further aspect of the invention, the registration of said downsampled reference and alignment images is performed on a central processing unit.

According to a further aspect of the invention, the method comprises using said new deformation field to initialize a registration on a central processing unit using double precision arithmetic.

According to another aspect of the invention, there is provided a program storage device readable by a computer, tangibly embodying a program of instructions executable by the computer to perform the method steps for non-rigid multimodal registration of digitized images.

DETAILED DESCRIPTION OF THE EXEMPLARY EMBODIMENTS

Figure 1:
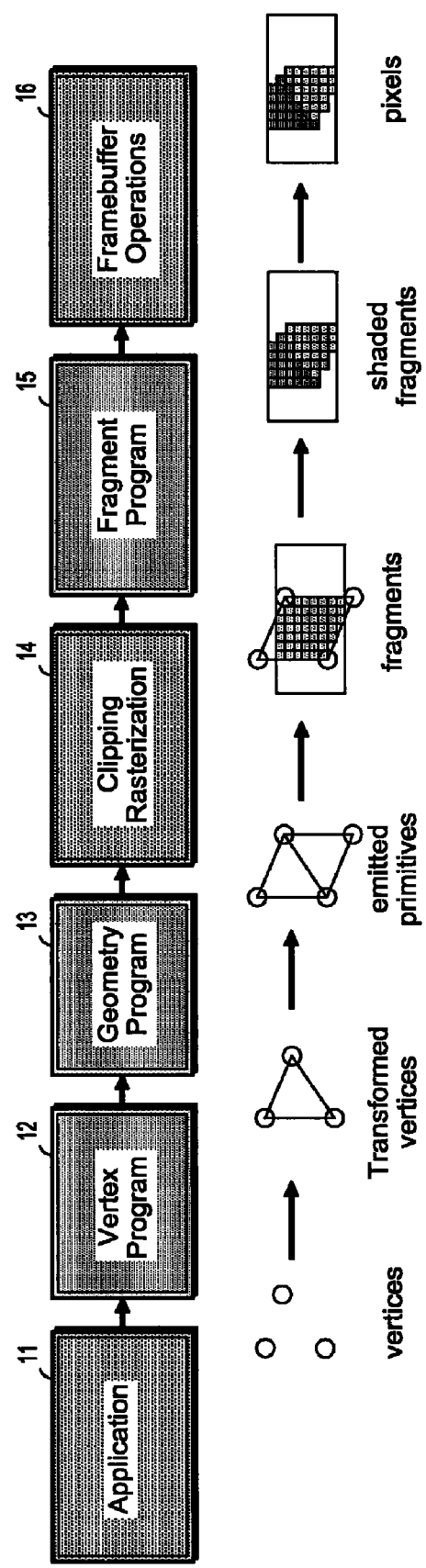
FIG. 1 depicts a block diagram of a graphics pipeline in OpenGL according to an embodiment of the invention.

Exemplary embodiments of the invention as described herein generally include systems and methods for GPU-accelerated registration of digital medical image volumes acquired from different imaging modalities. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Using the GPU as a coprocessor for arbitrary algorithms instead of graphics operations is called general purpose GPU programming (GPGPU). The programming model of the GPU is not as general as that of the CPU but grows more flexible with each new generation of graphics cards. The GPU is built to accelerate the rendering of three-dimensional scenes, and its design is tailored to this task. The scenes that are rendered are described by geometry data, that is, vertices that are connected to build lines, triangles and more complex shapes, and texture data, which are images that are mapped onto the geometry. Specialized application programmer interfaces (APIs) have been developed to enable software developers to utilize the capabilities of the GPU. Two exemplary APIs are the open source OpenGL interface, and the Direct3D interface from Microsoft. The graphics pipeline typically includes three main stages, in which the incoming data is processed: the vertex stage, the geometry stage and the fragment stage. FIG. 1 depicts a block diagram of a graphics pipeline in OpenGL. An application program 11 sends data describing a 3D model of an object to be rendered to the GPU. The vertex program 12 takes the 3D model as input and outputs vertex attributes, such as vertex positions and texture coordinates. In the geometry program 13, new geometric primitives, such as triangles and polygons, are generated from the provided vertex attributes. The clipping rasterization stage 14 clips those textures that would extend outside the 2D frame buffer boundary. In the fragment program 15, pixel shaders are executed for each fragment, with interpolated vertex attributes as input, and the output being written into the frame buffer. This is the stage that is mostly exploited for general purpose programming. Finally, at step 16, data in the frame buffer is mapped to pixels being displayed on a monitor. Up until recently, GPUs supported programmability in only two of the three stages, specifically the vertex and the fragment stage. However, the new DirectX-10 capable graphics cards can support programming of the geometry stage as well.

Since the processing of individual vertices or fragments is mostly independent from the processing of neighboring vertices or fragments, rendering is an inherently parallel task, and the GPU is tuned for the parallel processing of data. The GPU can be best described as a data-parallel streaming architecture, meaning that many similar operations are performed on an input stream. The data structures supported by the GPU are 1-, 2-, and 3-dimensional arrays which are called textures. These textures can be either writable or readable. The elements of these data structures are referred to as texels. In contrast to arrays, these texels can contain up to four elements with a precision of up to 32-bits. These four elements are the colors red, green, and blue, as well as the alpha channel. In order to perform a computation on these data structures, small programs, known as shaders, are employed.

Instead of rendering to the screen, the rendering can be directed into a texture. In GPGPU programming, the rendering is usually set up in such a way that the entire target texture is covered by a quadrilateral, so that every texel of the target texture corresponds to exactly one fragment that is generated when rendering the quadrilateral.

In contrast to the CPU, the access to the graphics card is more restricted. Up until recently, graphics APIs had to be used, and even computer languages that are tailored for general purpose programming had to be translated into graphics operations. The two major graphics APIs that are used for this are DirectX and OpenGL which offer nearly the same features. For shader programming, several languages exist, assembly level languages as well as higher level languages, like Cg, GLSL, or HLSL. An algorithm according to an embodiment of the invention can be implemented using OpenGL and GLSL.

A registration process according to an embodiment of the invention uses two metrics, mutual information (MI) between the reference image and the alignment image and the Kullback-Leibler divergence (KL) between a learned joint intensity distribution and an observed joint intensity distribution. Mutual information is a measure of the dependence of two random variables, in this case the reference and alignment image. The goal of the registration process is to maximize the dependence between the two images. The two images that are to be registered can be referred to by the functions $f_1:\Omega \subset R^n \mapsto R$ and $f_2:\Omega \subset R^n \mapsto R$. The images are registered by calculating an underlying displacement field. Given the images, a displacement field can be modeled by a mapping $u:\Omega \mapsto \Omega$. Without loss of generality, $i_1$ can be the reference image and $i_2$ can be the alignment image during the registration process. The alignment image is deformed by the deformation field u. The marginal and joint intensity distributions estimated from $i_1=f_1(x)$ and $i_2=f_2(x+u(x))$, respectively, are indicated by $p_1^o(i_1)$, $p_2^o(i_2)$ and $p_u^o(i_1, i_2)$. $p^l(i_1, i_2)$ is an estimate for the joint intensity distribution of the training data.

The mutual information metric can be defined by $$I_{MI}(u) = -\int_\Omega p_u^o(i_1, i_2) \ln \frac{p_u^o(i_1, i_2)}{p_1^o(i_1) p_2^o(i_2)} d i_1 d i_2, \quad (1)$$

where $p_u^o(i_1, i_2)$ is the joint intensity distribution of the two images after alignment, $p_1^o(i_1)$ is the intensity distribution of the reference image, and $p_2^o(i_2)$ is the intensity distribution of the alignment mage.

For multi-modal registration, such as the registration of CT and PET volumes, the maximization of mutual information does not mean that the pixel intensities of the two volumes are similar, but rather that their intensity distributions, interpreted as samples of a random variable, are maximally dependent.

The information gained from the MI metric is complemented by the second metric, the Kullback-Leibler (KL) divergence between a learned $p^l(i_1, i_2)$ distribution and an observed joint intensity distribution $p_u^o(i_1, i_2)$ of a reference and an alignment image that have been registered. The pre-registered data could either be retrieved from an expert manual registration or be acquired by a hybrid scanner system. The KL divergence can be written as:

$$I_{KL}(u) = \int_\Omega p_u^o(i_1, i_2) \ln \frac{p_u^o(i_1, i_2)}{p^l(i_1, i_2)} d i_1 d i_2. \quad (2)$$

The MI can be viewed as the KL divergence between the observed joint density and the product of the observed marginals, whereas in $I_{KL}$ the product of the marginal densities is replaced by the prior knowledge learned from training data.

Apart from the two metrics, certain deformation fields are more likely to occur than others, e.g., smooth deformations rather than deformations with discontinuities. In summary, EQ. (3), below, combines all mentioned aspects, i.e. the mutual information metric $I_{MI}$, the Kullback-Leibler divergence $I_{KL}$, and a regularizer R for smoothing. The factors $\alpha$ and $\lambda$ determine, respectively, the weight given to the two metrics and the amount of regularization performed.

$$J(u) = \alpha I_{MI}(u) + (1-\alpha) I_{KL}(u) + \lambda R(u), \alpha \in [0,1], \lambda \in R \quad (3)$$

The resulting minimization formulation, $\hat{u}=\arg \min J(u)$, can be solved by variational calculus by descending along the gradient $\nabla_u J$:

$$\nabla_u J(u) = \alpha \nabla_u I_{MI}(u) + (1-\alpha) \nabla_u I_{KL}(u) + \lambda \nabla_u R(u) \quad (4)$$

The classical gradient flow is:

$$u_t = -\nabla_u J,$$

with an initial condition $u_0$ being a suitable initial guess for the displacement field. Starting from an initial guess, a gradient descent strategy yields a solution for EQ. (4).

The gradient $\nabla_u I_{MI}(u)$ can be written as $$\nabla_u I_{MI} = -\frac{1}{M}\left(\left(\frac{\partial_2 p_u^o(i_1, i_2)}{p_u^o(i_1, i_2)} - \frac{\partial_2 p_2^o(i_2)}{p_2^o(i_2)}\right) * G_\sigma\right)(f_1(x), f_2(x+u(x))) \cdot \nabla f_2(x+u(x)),$$

and the gradient $\nabla_u I_{KL}$ can be written as $$\nabla_u I_{KL} = -\frac{1}{N}\left[\left(\frac{\partial_2 p_u^o(i_1, i_2)}{p_u^o(i_1, i_2)} - \frac{\partial_2 p^t(i_1, i_2)}{p^t(i_1, i_2)}\right) * G_\sigma\right]$$
$$(f_1(x), f_2(x+u(x))) \cdot \nabla f_2(x+u(x)),$$

where, $G_\sigma$ is a two-dimensional Gaussian with standard deviation $\sigma$, * represents convolution, $\partial_2$ is the partial derivative of a function with respect to its second variable, and M and N are normalizing constants.

Figure 2:
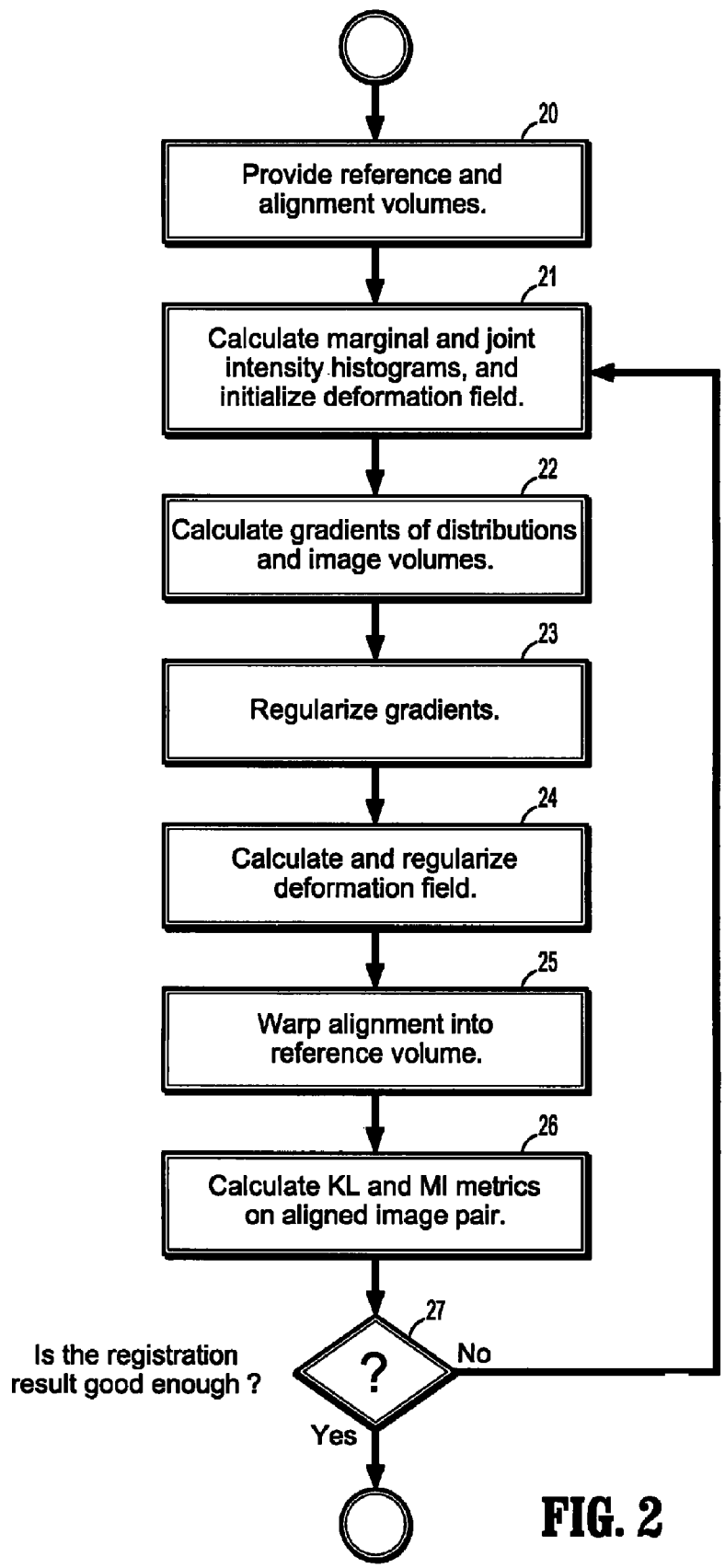
FIG. 2 is a flow chart of a registration pipeline, according to an embodiment of the invention.

FIG. 2 is a flow chart of a registration pipeline, according to an embodiment of the invention. Referring now to the figure, an algorithm according to an embodiment of the invention begins by providing at step 20 reference volume data and alignment volume data to a GPU. At step 21, the GPU computes the marginal and joint intensity histograms of the input volumes, and initializes the displacement field that will be used to register the images. At step 22, the gradients of the input volume data and the intensity histograms are computed, and the gradients are regularized at step 23 by a Gaussian smoothing. A displacement field is computed at step 24 from EQ. (4), and the alignment volume is warped by the displacement field to align with the reference field at step 25. The MI and KL metrics are computed on the warped images at step 26. At step 27, if the MI and KL values indicate that the is not good enough, the process loops back to step 21 and repeats steps 21 to 26, using the registered volumes as new input, until either the metrics indicate that the quality of the registration is high enough or until the quality of improvement of the last step falls below a predetermined threshold.

The GPU registration pipeline mirrors the CPU registration pipeline. The KL and MI metric are implemented as described above. Both use histograms on the GPU and Gaussian smoothing on the GPU, described in more detail below. A pixel shader computes the gradient on the volume. The gradient is smoothed as an approximation of the regularization, implemented as Gaussian blurring, described in more detail in the following sections. The regularized gradient is then used to compute a new displacement field, which is used to compute a new warped volume by looking up the corresponding position in the input volume according to the displacement field and using bilinear or trilinear interpolation. The entire registration pipeline shown in FIG. 2 can be implemented on the GPU with very little bus transfer between main memory and video memory. For operations on a small amount of data, however, it is often advantageous to download the data to the CPU.

Figure 3:
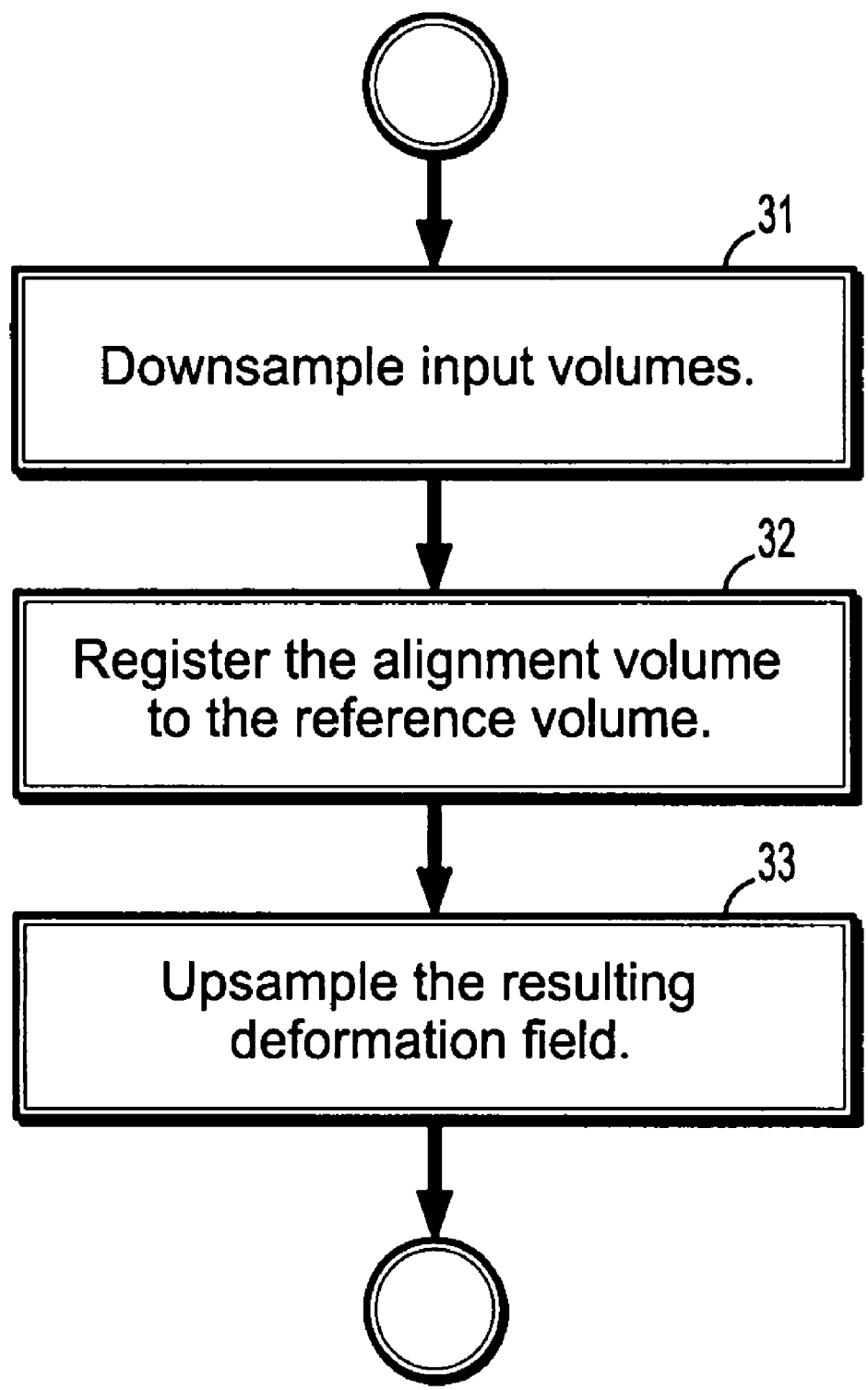
FIG. 3 is a flow chart of a registration pipeline using a hierarchy of resolutions, according to an embodiment of the invention.

In order to accelerate the convergence to the solution, a registration process according to an embodiment of the invention uses a multi-resolution approach, where the solution of a lower resolution optimization process is used as the starting point for the higher resolution registration process. FIG. 3 is a flow chart of a registration pipeline using a hierarchy of resolutions, according to an embodiment of the invention. Given a reference image and an alignment image, before the registration steps are performed, the input volumes are downsampled at step 31 to provide lower resolution images. The deformation field is computed at step 32 on the lower resolution images, and the resulting registered images are upsampled at step 33 to increase the resolution. The upsampled images are then used as a starting point for the next iteration in the registration loop, in order to achieve a faster convergence.

Figure 4:
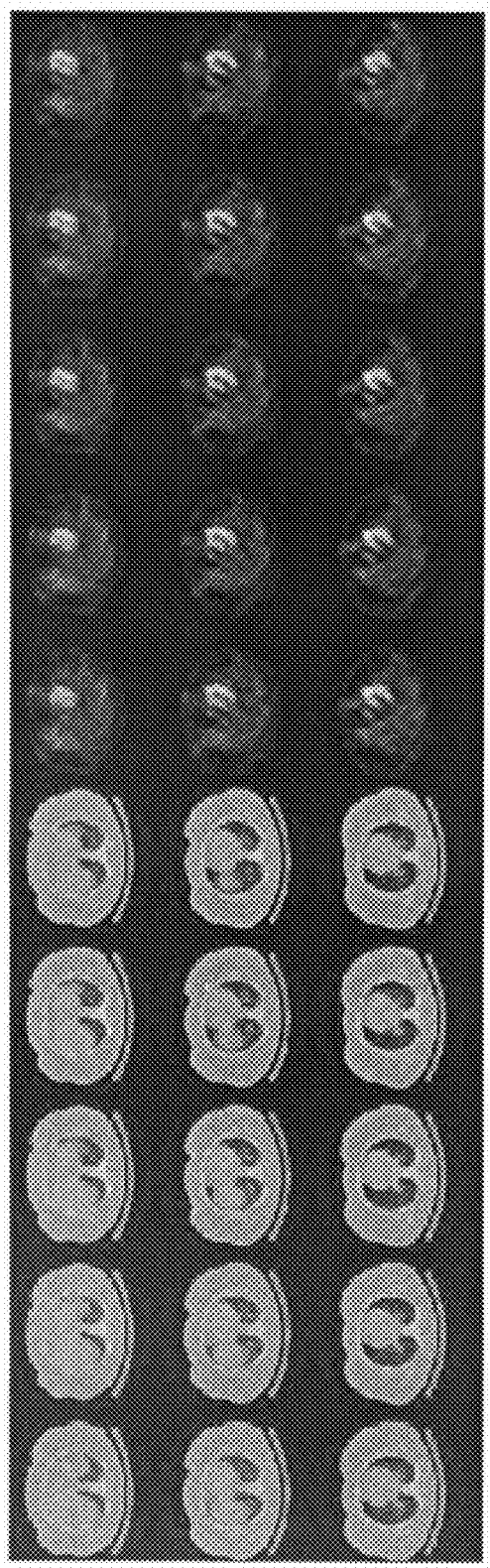
FIGS. 4(a)-(b) shows CT and the PET images as flat volume textures, according to an embodiment of the invention.
Figure 5:
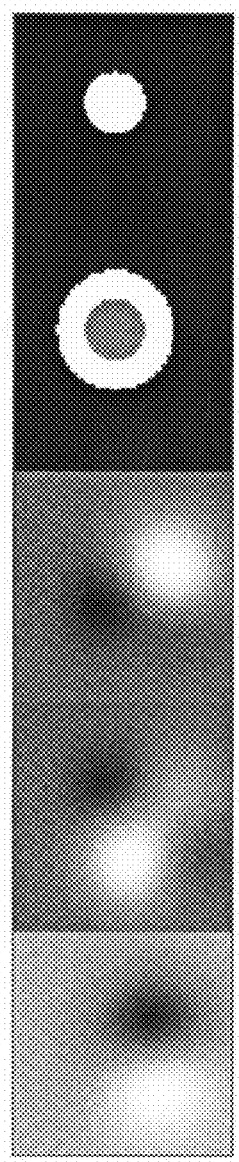
FIGS. 5(a)-(e) depict images illustrating how the progress of the registration process can be simultaneously visualized, according to an embodiment of the invention.

According to an embodiment of the invention, 2D image data can be stored as 2D textures, and 3D volumes can be stored as 2D textures as well where the slices are stored in a grid-like structure. FIGS. 4(a)-(b) illustrate exemplary image slices as flat volume textures, with CT slices in FIG. 4(a) on the left, and PET slices in FIG. 4(b) on the right. Typically, the image data is not linearized, but is stored in a tiled structure such as that shown in FIGS. 4(a)-(b).

These data structures are suitable for visualization purposes during registration, since the automatic interpolation provided by the graphics hardware can be leveraged. An intermediate registration result can be copied from the 32-bit floating point textures to a texture format that supports interpolation. The result of each registration step can be visualized directly, whether a single slice is to be visualized or a volume rendering of the whole volume is needed. However, more elaborate visualization options will slow down the registration process. For the volume rendering the necessary trilinear interpolation is executed as a linear interpolation between two slices, whereas the bilinear interpolation within the slice is carried out automatically (and faster) by the GPU.

FIGS. 5(a)-(e) depict how the progress of the registration process can be visualized simultaneously. The images of FIGS. 4(a)-(c) show the deformation field at different stages during the registration of the small circle shown in FIG. 4(e) to the two overlapping circles shown in FIG. 4(d). Visualizations like these can be easily integrated into the registration procedure and can provide insight into what happens during the registration.

Computing intensity distributions or histograms used to be an expensive step on the GPU, due to the lack of an efficient scatter operation as well as the lack of blending support for higher precision texture formats. The challenge is that addressing arbitrary memory positions and operating on the stored value destroys the independence between the processing of different elements, thus the parallel processing becomes more complicated and slower due to synchronization. One way of computing histograms, for a small number of bins, by casting the calculation as a graphics calculation, and using occlusion queries, which are a method of determining whether an object is visible. The traditional approach to creating histograms on the GPU is to use one occlusion query for every intensity bin and to count the pixels that are actually drawn.

Figure 6:
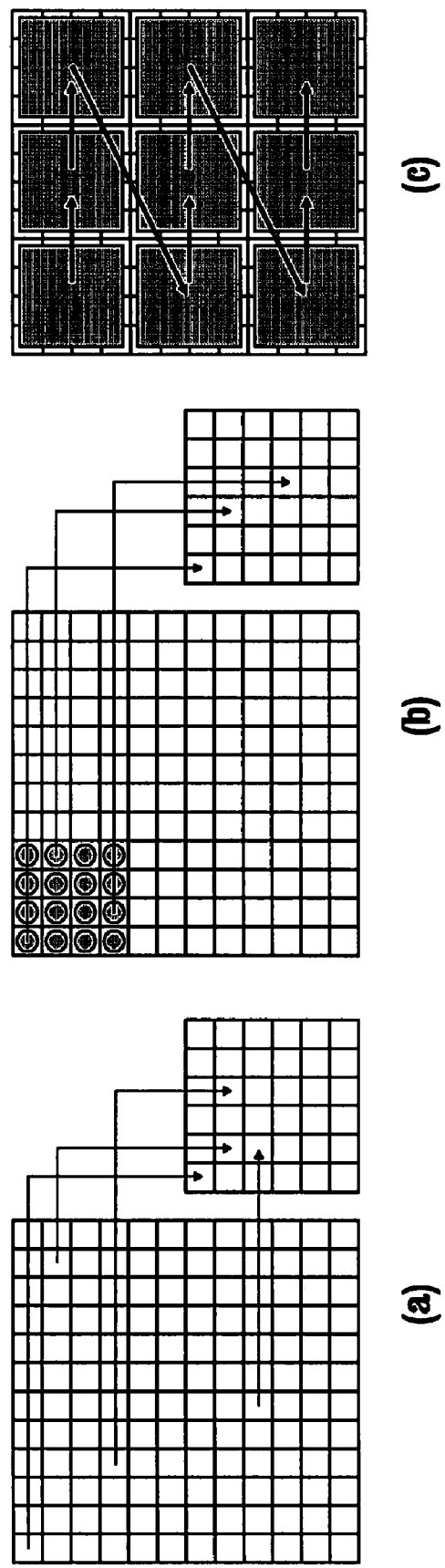
FIGS. 6(a)-(c) show the computation of a histogram on the GPU, according to an embodiment of the invention.

However, for a two-dimensional joint histogram with typical dimension 256 by 256, the cost for so many steps is prohibitive. Thus, according to an embodiment of the invention, instead of occlusion queries, floating point blending and vertex texture fetches are used. FIGS. 6(a)-(c) depict the computation of a 2-dimensional joint histogram on the GPU, according to an embodiment of the invention. On the CPU, the approach depicted in FIG. 6(a) is used. Going through the image, the values are written into the appropriate locations in the output histogram, as indicated by arrows from the left grid to the right grid. However, on an exemplary GPU used according to this embodiment of the invention (Nvidia Geforce 7800), there is no scatter operation available on the fragment stage. Instead, according to an embodiment of the invention, referring to FIG. 6(b), point primitives are drawn and moved to the appropriate position in the target texture according to a vertex texture fetch into the source image. Specifically, for every texel of the input texture, a corresponding vertex is drawn. In the vertex program, the output position of the vertex is shifted according to the intensities in the two input textures and rendered into a 256 by 256 tender target. The color rendered is the floating point value of 1.0. In the frame buffer operations stage, the result is accumulated in the render target with blending enabled.

The new generation of DirectX 10 capable graphics cards supports blending of 32-bit floating point textures as well as the use of integer textures, therefore the computation of the histogram can be performed in one step.

On older graphics cards, a more complicated approach needs to be used, because only 16-bit floating values can be blended on hardware. Due to the restriction of blending to 16-bit float textures, this operation has to be performed several times by moving a source rectangle over the source texture as shown FIG. 6(c). Care has to be taken, so that if the source rectangle moves over the border of the image, those values are not counted. The precision of this data type is sufficient for an addition by one only between the values of −2047 and 2048. Outside this range the numbers that can be represented lie farther apart than 1. To fully exploit the usable range, the render target is initialized with −2047. For each pass, less than 4096 values can be blended. Therefore a mesh with 64 by 63 vertices is shifted to access different parts of the input textures. The results of these partial histograms are then summed up into a 32-bit render target.

For the computation of the joint histogram, there are two source images and a target histogram with the dimensions 256×256. One-dimensional histograms are then computed by reducing the two-dimensional texture to a one-dimensional texture, while adding all the values during the reduction step.

The GPU can be used for Gaussian smoothing of the input data. For small filter dimensions, a brute force approach that still exploits the separability of the Gaussian filter is the fastest method. The filter coefficients can be stored in uniform variables, which are parameters for the shaders that do not vary from texel to texel, and the automatic interpolation of vertex attributes can be used instead of explicitly computing the position of the vertex sample. In an initialization step, a texture with the filter coefficients is precomputed. A pixel shader takes this filter texture and filters the input texture.

For very large filter widths, this approach can become inefficient. Gaussian smoothing on the CPU can be approximated by recursive filtering, thus making the computational cost independent of the filter dimensions. An $n^{th}$-order recursive filter approximation to a Gaussian filter can be implemented as $$y(i) = \sum_{k=0}^{m-1} a_k \exp\left(-\lambda_{i-k}\frac{i-k}{\sigma}\right) - \sum_{k=0}^{n} b_k y(i-k)$$

where the square difference $$\sum_i \left(\exp\left(-\frac{i^2}{2\sigma^2}\right) - \sum_{k=0}^{n} y(i)\right)^2$$

is minimized. Coefficient data can be kept in the cache of the CPU, so that high speeds are possible.

Figure 8:
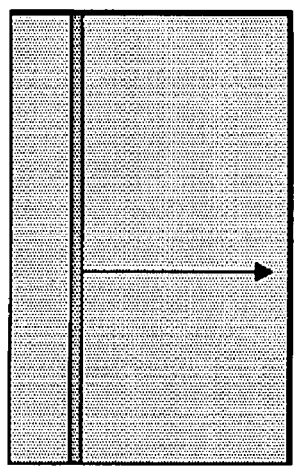
FIGS. 8(a)-(c) illustrate Gaussian smoothing on a GPU for large filter widths, according to an embodiment of the invention.
Figure 8:
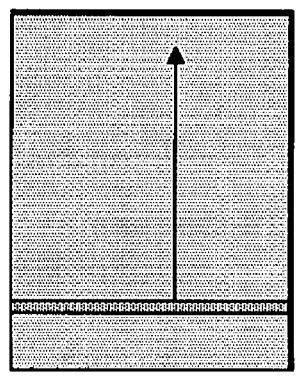
Figure 8:
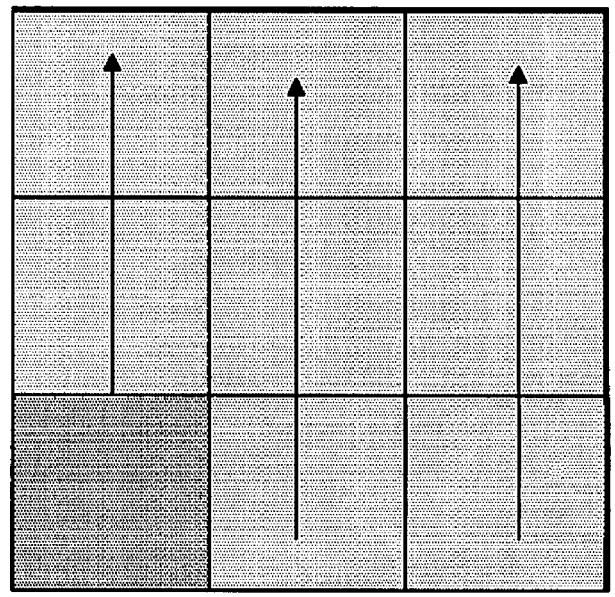

Due to the architectural differences between the GPU and the CPU, the smoothing is implemented differently on the GPU. Specifically, the input texture is read into a line or quad primitive in the x-, y-, and z-directions, and the GPU computes the smoothed results similar to the CPU implementation, but in parallel for all the pixels covered by the line or quad. The x,y,z directions refer to the volumes, because even though they are stored in 2d textures, they are inherently 3-dimensional. FIGS. 8(a)-(c) illustrate Gaussian smoothing on a GPU for large filter widths, according to an embodiment of the invention. Referring to the figure, provided there is a 2-dimensional image texture, the x-direction would be from left to right, as indicated in FIG. 8(a). The line primitive can cover exactly one column in the output texture, but the input data can come from random texels of the input texture. In this case, the data used is the data from the current column and the column(s) before the current column in the input texture. The line that is used for the scanning is a vertical line, that is, all pixels with the same x position are scanned at the same time, because the result in one column depends on all the previous columns, so one cannot process the whole 2D texture at once. The rows of the output texture are independent because of the separability of the filter. Thus, for smoothing in the x-direction, the line primitive advances from the left to the right, using the results that have been computed in the previous pass (i.e., the previous line), in order to generate the values written by the current line to the texture. Similar considerations apply to scans in the y- and z-directions. The y direction is scanned from up to down, as depicted in FIG. 8(b). In the case of flat volume textures one does exactly the same thing, it is just that the z direction is represented by different tiles in the textures, so in that case one advances from tile to tile, as illustrated in FIG. 8(c), where the tile is read into a normal quad primitive.

According to further embodiments of the invention, there are hybrid implementations that use both the CPU and the GPU for registration. One embodiment executes the lower resolution steps on the CPU, since there is insufficient data to adequately use the parallel computing power of the GPU, considering the overhead from shader and texture management. According to another embodiment of the invention, the result of the GPU implementation is used as starting point for the CPU implementation. This way, the GPU handles many steps in the beginning and outputs a good estimate for the registration, which is then refined on the CPU using double precision 64-bit arithmetic.

Several registration experiments were performed using various GPU implementations. According to an embodiment of the invention, one experiment uses a synthetic 2-dimensional data set, in which one rectangle is mapped to another rectangle. With a resolution of 512×512 pixels, one iteration of the registration process is 6- to 8-times faster on a GPU as compared to a CPU implementation, yielding comparable results. According to an embodiment of the invention, two multi-modal medical volumes are used, a CT volume and a corresponding PET volume. These two datasets are registered using the CPU for the first two steps using, respectively, one fourth and one half of the resolution, and using the GPU for the final step at the full resolution. Iterations on the highest resolution take 22.95 sec on average on a CPU (a Pentium 4 running at 2.0 GHz), whereas a GPU implementation needs about 3.9 sec per iteration step. Surprisingly, the difference between the precision of the operations (floating point on the GPU, single precision on the CPU, or double-precision on the CPU) results in only minor differences, whereas the quality of the learned joint histogram has a bigger influence on the result.

Figure 7:
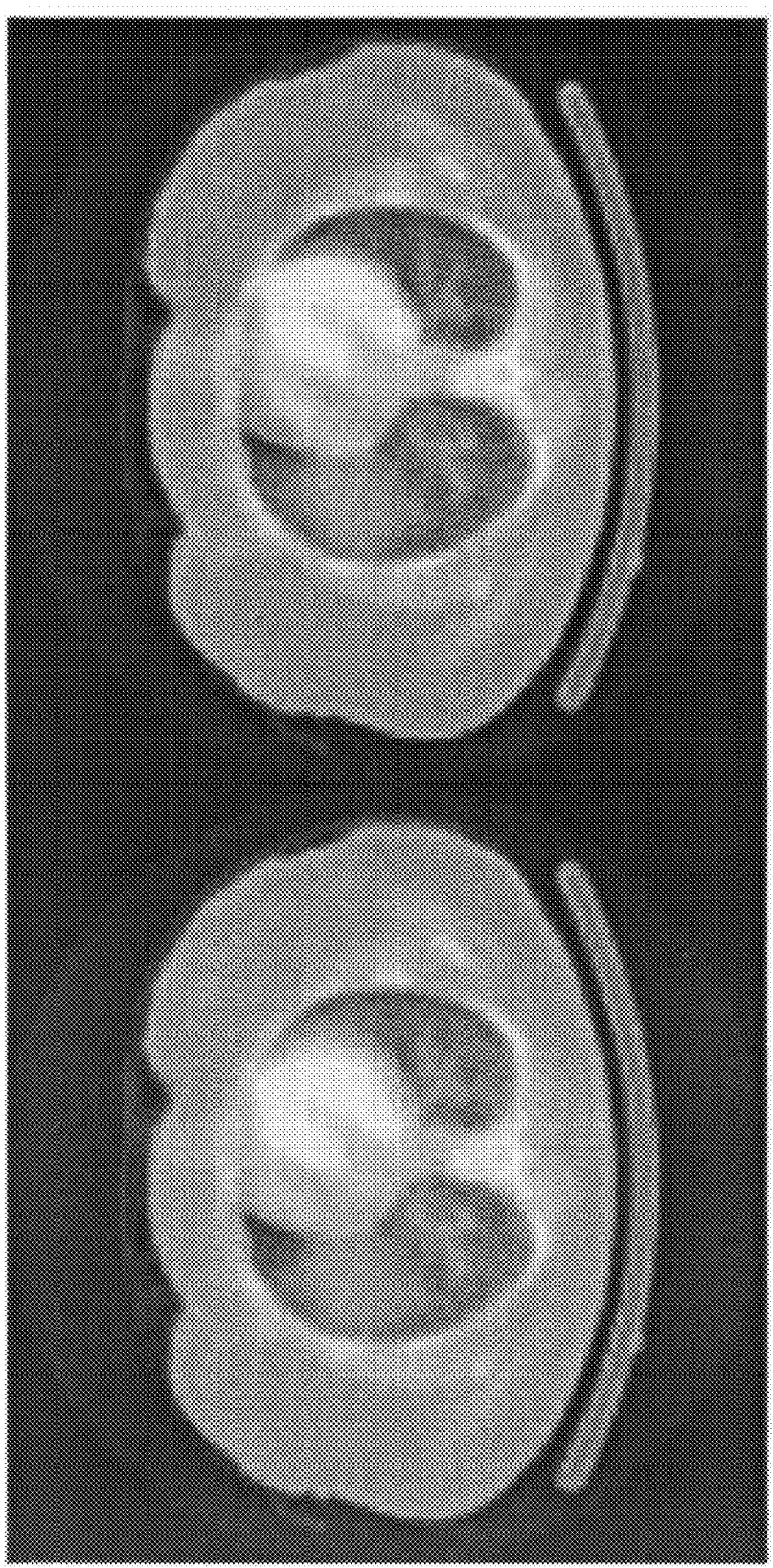
FIG. 7 illustrates a slice from the CT volume with the corresponding slice from the PET volume before and after the registration, according to an embodiment of the invention.

FIGS. 7(a)-(b) depicts a slice from the CT volume with the corresponding slice from the PET volume before the registration next to the result after the registration. The left image, FIG. 7(a), shows the overlay of the unregistered slices while the right image, FIG. 7(b) shows the CT volume overlaid with both the registered PET slice.

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 9:
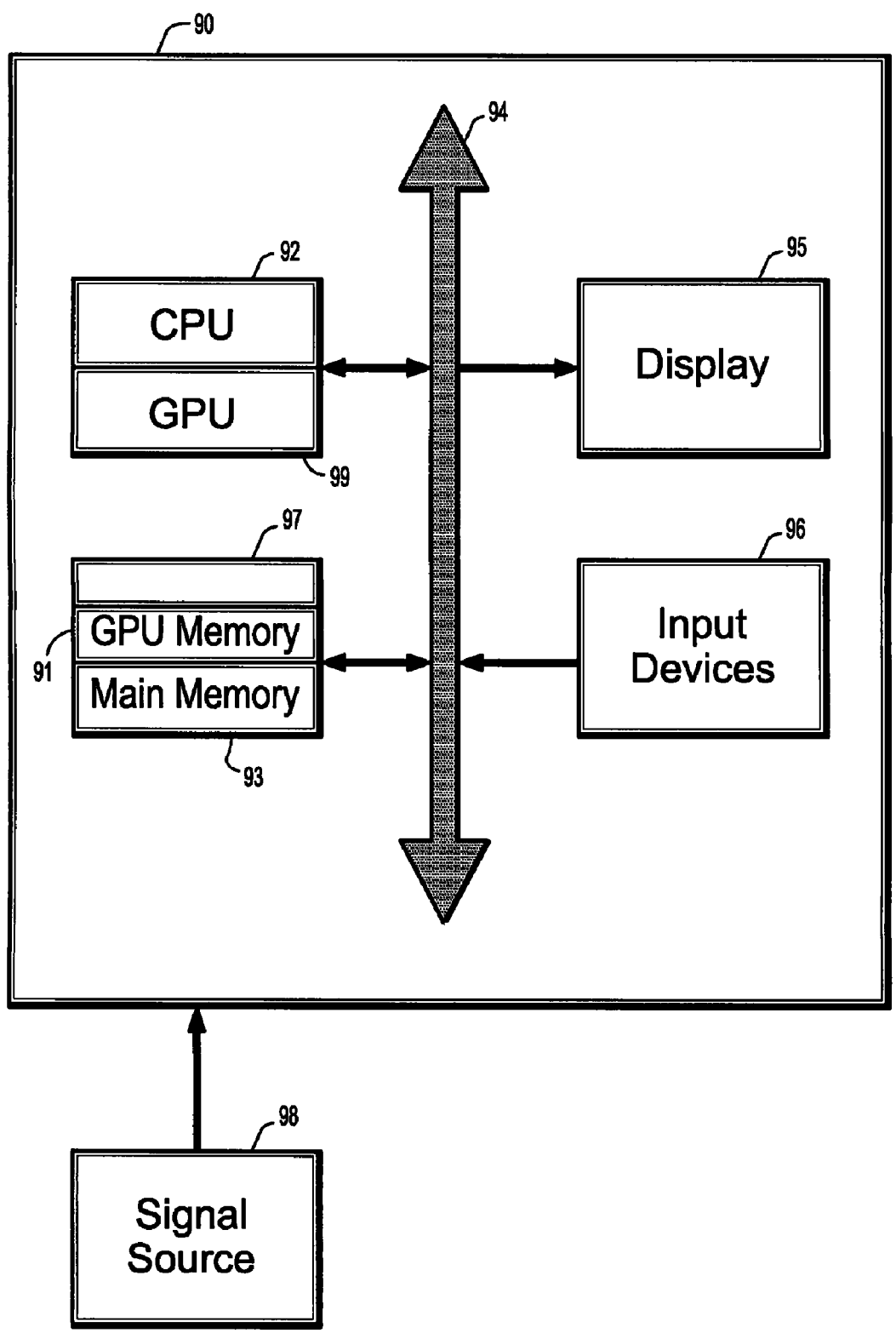
FIG. 9 is a block diagram of an exemplary computer system for implementing a GPU-accelerated image registration method, according to an embodiment of the invention.

FIG. 9 is a block diagram of an exemplary computer system for implementing a GPU-based non-rigid registration method according to an embodiment of the invention. Referring now to FIG. 9, a computer system 90 for implementing the present invention can comprise, inter alia, a central processing unit (CPU) 92, a main memory 93 and an input/output (I/O) interface 94. The computer system 90 is generally coupled through the I/O interface 94 to a graphics processing unit (GPU) 99 and display 95 and various input devices 96 such as a mouse and a keyboard. The GPU has its own memory 91. The support circuits can include circuits such as cache, power supplies, clock circuits, and a communication bus. The memory 93 can include random access memory (RAM), read only memory (ROM), disk drive, tape drive, etc., or a combinations thereof. The present invention can be implemented as a routine 97 that is stored in memory 93 and executed by the CPU 92 to process the signal from the signal source 98. As such, the computer system 90 is a general purpose computer system that becomes a specific purpose computer system when executing the routine 97 of the present invention.

The computer system 90 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method for non-rigid multi-modal registration of digitized images comprising the steps of:
   providing a reference image and an alignment images acquired from different imaging modalities to a graphics processing unit (GPU), wherein each said image comprises a set of intensities defined on a 3-dimensional (3D) grid of points;
   initializing a deformation field for registering said reference image and said alignment image;
   computing marginal and joint intensity histograms of the reference image and the alignment image as registered by said deformation field;
   computing gradients of the reference and registered alignment images and of their respective marginal and joint intensity histograms;
   smoothing said histograms and gradients using Gaussian filters;
   calculating a new deformation field using said smoothed gradients; and
   registering said alignment image to said reference image using said deformation field.

2. The method of claim 1, further comprising calculating a mutual information metric and a Kullback-Leibler (KL) divergence metric from said reference image and said registered alignment image wherein a quality of said registration is determined.

3. The method of claim 1, wherein said gradients are computed by a pixel shader on said GPU.

4. The method of claim 1, further comprising storing histograms as 2D textures in a memory associated with said GPU, and storing each 3D image as a sequence of 2D slices in a sequence of 2D textures tile in said GPU memory.

5. The method of claim 4, further comprising copying a 2D slice of the registered alignment image to a texture format that supports interpolation, performing bilinear interpolation on texels within said slice, and displaying said interpolated slice on a display monitor.

6. The method of claim 4, wherein calculating a joint histogram comprises providing a vertex for a texel of a 2D slice of one of said reference or alignment images, shifting, in a vertex program of said GPU, the output position of the vertex according to the intensities associated with the texel in the corresponding slices of the reference image and alignment image, and rendering said texel into a 2D target representing said histogram as a floating point value of 1.0 wherein said value is accumulated by a frame buffer operations stage of said GPU in the target with blending enabled.

7. The method of claim 4, wherein calculating a marginal histogram of one of said reference or alignment images comprises selecting an intensity bin of said histogram, performing an occlusion query for said intensity bin in one of reference or alignment images, and counting the number of points returned by said query.

8. The method of claim 1, wherein smoothing said histograms and gradients using Gaussian filters comprises storing filter coefficients in uniform variables associated with a pixel shader, precomputing a texture with the filter coefficients, and providing said precomputed texture to said pixel shader wherein said texture is filtered using automatic interpolation of vertex attributes provided by said shader.

9. The method of claim 4, wherein smoothing said histograms and gradients using Gaussian filters comprises, for a histogram or gradient represented by a 2D texture, for each of an x-, y-directions, writing one line at a time while using the data from the input texture at the position of the line, smoothing all texel values in said line primitive in parallel for all the texels covered by the line, reading a next line of said texture into said line primitive, smoothing all texel values in said line primitive in parallel for all the texels covered by the line wherein said smoothed texel values from a current line are weighted by the smoothing results from previous lines.

10. The method of claim 9, wherein smoothing said histograms and gradients using Gaussian filters for a z-direction comprises writing one tile at a time while using the data from the input texture at the position of the tile, smoothing all texel values in said quad primitive in parallel for all the texels covered by the tile, reading a next tile of said texture into said quad primitive, smoothing all texel values in said quad primitive in parallel for all the texels covered by the tile wherein said smoothed texel values from a current tile are weighted by the smoothing results from previous tiles.

11. The method of claim 1, further comprising downsampling said reference and alignment images prior to calculating a new deformation field, upsampling the new deformation field calculated to register said reference and alignment images, and using said upsampled deformation field to initialize another registration of said reference and alignment images.

12. The method of claim 11, wherein the registration of said downsampled reference and alignment images is performed on a central processing unit.

13. The method of claim 1, further comprising using said new deformation field to initialize a registration on a central processing unit using double precision arithmetic.

14. A method for non-rigid multi-modal registration of digitized images comprising the steps of:
  providing a reference image and an alignment images acquired from different imaging modalities to a graphics processing unit (GPU), wherein each said image comprises a set of intensities defined on a 3-dimensional (3D) grid of points, and each 3D image is stored as a sequence of 2D slices in a sequence of 2D textures tile in said GPU memory;
  initializing a deformation field for registering said reference image and said alignment image;
  computing marginal and joint intensity histograms of the reference image and the alignment image as registered by said deformation field and storing said histograms as 2D textures in a memory associated with said GPU;
  computing gradients of the reference and registered alignment images and of their respective marginal and joint intensity histograms;
  smoothing said histograms and gradients using Gaussian filters;
  calculating a new deformation field from said gradients;
  smoothing said deformation field using said Gaussian filter; and
  registering said alignment image to said reference image using said deformation field.

15. A non-transitory computer readable program storage medium readable by a computer, tangibly embodying a program of instructions executable by the computer to perform the method steps for non-rigid multi-modal registration of digitized images comprising the steps of:
  providing a reference image and an alignment images acquired from different imaging modalities to a graphics processing unit (GPU), wherein each said image comprises a set of intensities defined on a 3-dimensional (3D) grid of points;
  initializing a deformation field for registering said reference image and said alignment image;
  computing marginal and joint intensity histograms of the reference image and the alignment image as registered by said deformation field;
  computing gradients of the reference and registered alignment images and of their respective marginal and joint intensity histograms;
  smoothing said histograms and gradients using Gaussian filters;
  calculating a new deformation field using said smoothed gradients; and
  registering said alignment image to said reference image using said deformation field.

16. The non transitory computer readable program storage medium of claim 15, the method further comprising calculating a mutual information metric and a Kullback-Leibler (KL) divergence metric from said reference image and said registered alignment image wherein a quality of said registration is determined.

17. The non-transitory computer readable program storage medium of claim 15, wherein said gradients are computed by a pixel shader on said GPU.

18. The non-transitory computer readable program storage device of claim 15, the method further comprising storing histograms as 2D textures in a memory associated with said GPU, and storing each 3D image as a sequence of 2D slices in a sequence of 2D textures tile in said GPU memory.

19. The non-transitory computer readable program storage medium of claim 18, the method further comprising copying a 2D slice of the registered alignment image to a texture format that supports interpolation, performing bilinear interpolation on texels within said slice, and displaying said interpolated slice on a display monitor.

20. The non-transitory computer readable program storage medium of claim 18, wherein calculating a joint histogram comprises providing a vertex for a texel of a 2D slice of one of said reference or alignment images, shifting, in a vertex program of said GPU, the output position of the vertex according to the intensities associated with the texel in the corresponding slices of the reference image and alignment image, and rendering said texel into a 2D target representing said histogram as a floating point value of 1.0 wherein said value is accumulated by a frame buffer operations stage of said GPU in the target with blending enabled.

21. The non-transitory computer readable program storage medium of claim 18, wherein calculating a marginal histogram of one of said reference or alignment images comprises selecting an intensity bin of said histogram, performing an occlusion query for said intensity bin in one of reference or alignment images, and counting the number of points returned by said query.

22. The non-transitory computer readable program storage medium of claim 15, wherein smoothing said histograms and gradients using Gaussian filters comprises storing filter coefficients in uniform variables associated with a pixel shader, precomputing a texture with the filter coefficients, and providing said precomputed texture to said pixel shader wherein said texture is filtered using automatic interpolation of vertex attributes provided by said shader.

23. The non-transitory computer readable program storage medium of claim 18, wherein smoothing said histograms and gradients using Gaussian filters comprises, for a histogram or gradient represented by a 2D texture, for each of an x-, y-directions, writing one line at a time while using the data from the input texture at the position of the line, smoothing all texel values in said line primitive in parallel for all the texels covered by the line, reading a next line of said texture into said line primitive, smoothing all texel values in said line primitive in parallel for all the texels covered by the line wherein said smoothed texel values from a current line are weighted by the smoothing results from previous lines.

24. The non-transitory computer readable program storage medium of claim 23, wherein smoothing said histograms and gradients using Gaussian filters for a z-direction comprises writing one tile at a time while using the data from the input texture at the position of the tile, smoothing all texel values in said quad primitive in parallel for all the texels covered by the tile, reading a next tile of said texture into said quad primitive, smoothing all texel values in said quad primitive in parallel for all the texels covered by the tile wherein said smoothed texel values from a current tile are weighted by the smoothing results from previous tiles.

25. The non-transitory computer readable program storage medium of claim 15, the method further comprising downsampling said reference and alignment images prior to calculating a new deformation field, upsampling the new deformation field calculated to register said reference and alignment images, and using said upsampled deformation field to initialize another registration of said reference and alignment images.

26. The non-transitory computer readable program storage medium of claim 25, wherein the registration of said downsampled reference and alignment images is performed on a central processing unit.

27. The non-transitory computer readable program storage medium of claim 15, the method further comprising using said new deformation field to initialize a registration on a central processing unit using double precision arithmetic.

* * * * *